(12) United States Patent
Shiho et al.

(10) Patent No.: US 7,303,187 B2
(45) Date of Patent: Dec. 4, 2007

(54) IMAGE FORMATION APPARATUS AND PAPER FEED CONTROL METHOD THEREFOR

(75) Inventors: Yuichi Shiho, Iwatsuki (JP); Takashi Sakayama, Ebina (JP); Toshitaka Nakagawa, Iwatsuki (JP); Minoru Yoshida, Iwatsuki (JP); Toshiyu Ishikawa, Ebina (JP); Tsuyoshi Watanabe, Iwatsuki (JP); Manabu Hayashi, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 117 days.

(21) Appl. No.: 10/384,608

(22) Filed: Mar. 11, 2003

(65) Prior Publication Data

US 2003/0230842 A1 Dec. 18, 2003

(30) Foreign Application Priority Data

Jun. 14, 2002 (JP) .............................. 2002-174567

(51) Int. Cl.
*B65H 3/44* (2006.01)
(52) U.S. Cl. .................. 271/9.01; 271/9.05; 271/9.02; 358/449; 399/81
(58) Field of Classification Search ............... 271/9.01, 271/9.05, 9.06, 9.04; 399/81, 391, 45
See application file for complete search history.

(56) References Cited

U.S. PATENT DOCUMENTS

| | | | | |
|---|---|---|---|---|
| 6,010,261 A | * | 1/2000 | Maekawa | ................... 400/605 |
| 6,785,507 B2 | * | 8/2004 | Asai et al. | ................... 399/391 |
| 6,817,794 B2 | * | 11/2004 | Kakutani | .................... 400/582 |
| 2002/0118975 A1 | * | 8/2002 | Asai | ........................... 399/45 |

FOREIGN PATENT DOCUMENTS

| | | |
|---|---|---|
| JP | A-7-264349 | 10/1995 |
| JP | A-9-93376 | 4/1997 |
| JP | A-9-200461 | 7/1997 |
| JP | A 11-205524 | 7/1999 |

\* cited by examiner

*Primary Examiner*—Patrick Mackey
*Assistant Examiner*—Kaitlin S Joerger
(74) *Attorney, Agent, or Firm*—Oliff & Berridge, PLC

(57) ABSTRACT

An image formation apparatus which has multiple paper feed units and performs plural types of processing including at least facsimile processing, comprising a paper feeding subject setting unit which sets availability of paper feeding of each of the paper feed units when at least the facsimile processing is performed; and a warning unit which issues a warning when all the paper feed units are excluded from paper feeding at the time of the facsimile processing as a result of setting by the paper feeding subject setting unit.

16 Claims, 19 Drawing Sheets

| PAPER FEED TRAY | PAPER SIZE | PAPER TYPE | TRAY CONDITION | COPY | FAX | PRINTER | OTHER |
|---|---|---|---|---|---|---|---|
| TRAY 1 | A4 LANDSCAPE | ORDINARY PAPER | NORMAL | ○ | ○ | ○ | ○ |
| TRAY 2 | A4 LANDSCAPE | RECYCLED PAPER | NORMAL | ○ | × | ○ | ○ |
| TRAY 3 | A4 LANDSCAPE | OHP SHEET | NORMAL | ○ | ○ | × | × |
| TRAY 4 | A4 PORTRAIT | BOND PAPER | NORMAL | ○ | × | × | × |
| TRAY 5 | B5 PORTRAIT | ORDINARY PAPER | NORMAL | × | × | ○ | × |
| TRAY 6 | — | ORDINARY PAPER | NO PAPER | × | × | × | × |
| TRAY 7 | — | — | FAILURE | × | × | × | × |

FIG.3

| PAPER SIZE | COPY | FAX | PRINTER | OTHER |
|---|---|---|---|---|
| A3 PORTRAIT | ○ | ○ | ○ | × |
| B4 PORTRAIT | ○ | ○ | ○ | × |
| A4 PORTRAIT | ○ | ○ | ○ | ○ |
| A4 LANDSCAPE | ○ | ○ | ○ | ○ |
| B5 PORTRAIT | ○ | × | ○ | × |
| B5 LANDSCAPE | ○ | × | ○ | × |
| LETTER PORTRAIT | ○ | ○ | × | × |
| LETTER LANDSCAPE | ○ | ○ | × | × |
| POSTCARD | × | × | ○ | × |

FIG.5

| PAPER TYPE | COPY | FAX | PRINTER | OTHER |
|---|---|---|---|---|
| ORDINARY PAPER | ○ | ○ | ○ | ○ |
| RECYCLED PAPER | ○ | × | ○ | ○ |
| BOND PAPER | ○ | ○ | × | × |
| COLOR PAPER | ○ | × | × | × |
| CARDBOARD | ○ | × | × | × |
| OHP SHEET | ○ | × | × | × |

FIG.6

| PAPER FEED TRAY | PAPER SIZE | PAPER TYPE | TRAY CONDITION |
|---|---|---|---|
| TRAY 1 | A4 LANDSCAPE | ORDINARY PAPER | NORMAL |
| TRAY 2 | A4 LANDSCAPE | RECYCLED PAPER | NORMAL |
| TRAY 3 | A4 LANDSCAPE | OHP SHEET | NORMAL |
| TRAY 4 | A4 PORTRAIT | BOND PAPER | NORMAL |
| TRAY 5 | B5 PORTRAIT | ORDINARY PAPER | NORMAL |
| TRAY 6 | — | ORDINARY PAPER | NO PAPER |
| TRAY 7 | — | — | FAILURE |

FIG.9

| PAPER FEED TRAY | PRIORITY OF TRAY |
|---|---|
| TRAY 1 | 2 |
| TRAY 2 | 1 |
| TRAY 3 | 3 |
| TRAY 4 | 4 |
| TRAY 5 | 5 |
| TRAY 6 | 6 |
| TRAY 7 | 7 |

FIG.11

| PAPER FEED TRAY | PAPER SIZE | PAPER TYPE | TRAY CONDITION | PRIORITY OF TRAY | COPY | FAX | PRINTER | OTHER |
|---|---|---|---|---|---|---|---|---|
| TRAY 1 | A4 LANDSCAPE | ORDINARY PAPER | NORMAL | 2 | ○ | ○ | ○ | ○ |
| TRAY 2 | A4 LANDSCAPE | RECYCLED PAPER | NORMAL | 1 | ○ | × | ○ | ○ |
| TRAY 3 | A4 LANDSCAPE | OHP SHEET | NORMAL | 3 | ○ | ○ | × | × |
| TRAY 4 | A4 PORTRAIT | BOND PAPER | NORMAL | 4 | ○ | × | × | × |
| TRAY 5 | B5 PORTRAIT | ORDINARY PAPER | NORMAL | 5 | × | × | ○ | × |
| TRAY 6 | — | ORDINARY PAPER | NO PAPER | 6 | × | × | × | × |
| TRAY 7 | — | — | FAILURE | 7 | × | × | × | × |

FIG.12

| PAPER FEED TRAY | PAPER SIZE | PAPER TYPE | TRAY CONDITION | PRIORITY OF TRAY | ORDER OF TRAY USE |
|---|---|---|---|---|---|
| TRAY 1 | A4 LANDSCAPE | ORDINARY PAPER | NORMAL | 2 | 2 |
| TRAY 2 | A4 LANDSCAPE | RECYCLED PAPER | NORMAL | 1 | 1 |
| TRAY 3 | A4 LANDSCAPE | OHP SHEET | NORMAL | 3 | — |
| TRAY 4 | A4 PORTRAIT | BOND PAPER | NORMAL | 4 | 3 |
| TRAY 5 | B5 PORTRAIT | ORDINARY PAPER | NORMAL | 5 | — |
| TRAY 6 | — | ORDINARY PAPER | NO PAPER | 6 | — |
| TRAY 7 | — | — | FAILURE | 7 | — |

FIG.13

| PAPER TYPE | PRIORITY |
|---|---|
| ORDINARY PAPER | 2 |
| RECYCLED PAPER | 1 |
| BOND PAPER | 3 |
| COLOR PAPER | 4 |
| CARDBOARD | 5 |

| PAPER FEED TRAY | PAPER SIZE | PAPER TYPE | TRAY CONDITION | PRIORITY BY PAPER TYPE | COPY | FAX | PRINTER | OTHER |
|---|---|---|---|---|---|---|---|---|
| TRAY 1 | A4 LANDSCAPE | ORDINARY PAPER | NORMAL | 2 | ○ | ○ | ○ | ○ |
| TRAY 2 | A4 LANDSCAPE | RECYCLED PAPER | NORMAL | 1 | ○ | × | ○ | ○ |
| TRAY 3 | A4 LANDSCAPE | OHP SHEET | NORMAL | — | ○ | × | × | × |
| TRAY 4 | A4 PORTRAIT | BOND PAPER | NORMAL | 3 | ○ | ○ | × | × |
| TRAY 5 | B5 PORTRAIT | ORDINARY PAPER | NORMAL | 2 | × | × | ○ | × |
| TRAY 6 | — | ORDINARY PAPER | NO PAPER | 2 | × | × | × | × |
| TRAY 7 | — | — | FAILURE | — | × | × | × | × |

FIG.16

| PAPER FEED TRAY | PAPER SIZE | PAPER TYPE | TRAY CONDITION | PRIORITY BY PAPER TYPE | ORDER OF TRAY USE |
|---|---|---|---|---|---|
| TRAY 1 | A4 LANDSCAPE | ORDINARY PAPER | NORMAL | 2 | 2 |
| TRAY 2 | A4 LANDSCAPE | RECYCLED PAPER | NORMAL | 1 | 1 |
| TRAY 3 | A4 LANDSCAPE | OHP SHEET | NORMAL | — | — |
| TRAY 4 | A4 PORTRAIT | BOND PAPER | NORMAL | 3 | 3 |
| TRAY 5 | B5 PORTRAIT | ORDINARY PAPER | NORMAL | 2 | — |
| TRAY 6 | — | ORDINARY PAPER | NO PAPER | 2 | — |
| TRAY 7 | — | — | FAILURE | — | — |

FIG.17

| PAPER FEED TRAY | PAPER SIZE | PAPER TYPE | TRAY CONDITION | PRIORITY OF TRAY | PRIORITY BY PAPER TYPE | PRIORITY (OVERALL) | FAX |
|---|---|---|---|---|---|---|---|
| TRAY 1 | A4 PORTRAIT | ORDINARY PAPER | NORMAL | 02 | 02 | 0202 | ○ |
| TRAY 2 | A4 PORTRAIT | COLOR PAPER | NORMAL | 01 | 04 | 0401 | × |
| TRAY 3 | A4 PORTRAIT | RECYCLED PAPER | NORMAL | 03 | 01 | 0103 | × |
| TRAY 4 | A4 PORTRAIT | BOND PAPER | NORMAL | 04 | 03 | 0304 | ○ |
| TRAY 5 | A4 PORTRAIT | ORDINARY PAPER | NORMAL | 05 | 02 | 0205 | × |

FIG.18

| PAPER FEED TRAY | PAPER SIZE | PAPER TYPE | TRAY CONDITION | PRIORITY OF TRAY | PRIORITY BY PAPER TYPE | PRIORITY (OVERALL) | ORDER OF TRAY USE |
|---|---|---|---|---|---|---|---|
| TRAY 1 | A4 PORTRAIT | ORDINARY PAPER | NORMAL | 02 | 02 | 0202 | 2 |
| TRAY 2 | A4 PORTRAIT | COLOR PAPER | NORMAL | 01 | 04 | 0401 | — |
| TRAY 3 | A4 PORTRAIT | RECYCLED PAPER | NORMAL | 03 | 01 | 0103 | — |
| TRAY 4 | A4 PORTRAIT | BOND PAPER | NORMAL | 04 | 03 | 0304 | 1 |
| TRAY 5 | A4 PORTRAIT | ORDINARY PAPER | NORMAL | 05 | 02 | 0205 | 3 |

FIG.19

IMAGE FORMATION APPARATUS AND PAPER FEED CONTROL METHOD THEREFOR

BACKGROUND OF THE INVENTION

1. Field of the Invention

The present invention relates to an image formation apparatus and its paper feed control method, and more particularly to an image formation apparatus, which has a facsimile function and can set automatic paper feed, and its paper feed control method.

2. Description of the Related Art

A conventional facsimile machine, which can set plural recording sheets, automatically selects an appropriate paper feed tray according to a size of the received image and prints it on an appropriate recording sheet.

A multi-functional machine which has copying and printing functions in addition to a facsimile function might have a paper feed tray in which recording sheets not desired to be used for automatic printing out of facsimile-received documents are held.

An example of the recording sheet not desired to be used is a nonstandard-size sheet. When a received image is automatically printed on a nonstandard-size sheet, it becomes necessary to copy it to a standard-size sheet for storage later, and it is uneconomical. An OHP sheet is also used as a recording sheet. The OHP sheet is relatively expensive, and when its both sides are used for printing and its one side is copied, the opposite side image is also copied. Thus, it is hard to copy the original image information shown on both sides of the OHP sheet.

To prevent the above drawbacks, there is, for example, a "Printer having a facsimile communication function" described in Japanese Patent Application Laid-Open Publication No. 11-205524. It discloses a structure in which a paper size discrimination unit and a paper type discrimination unit are provided, and only when the size of paper stored in a tray is appropriate for facsimile reception printing and the paper type is ordinary paper, the tray is judged to be a paper feed tray But, according to the above-described conventional technology, there may be a case where all the trays are judged to be nontarget trays for automatic paper feeding. If such a state occurs, a facsimile received document cannot be printed out at all, possibly resulting in a trouble that reception is refused or the machine stops without printing out a received document. And, when a user-designated set value is applied to the setting of a paper type, the machine falls in such a set state, but no unit was available to notify such an error.

Therefore, the present invention provides an image formation apparatus having a facsimile function, which can set a tray for automatic paper feeding and prevent a problem involved in the setting, and its paper feed control method.

SUMMARY OF THE INVENTION

The present invention has been made in view of the above circumstances, and an aspect of the present invention is an image formation apparatus which has multiple paper feed units and performs plural types of processing including at least facsimile processing, comprising: a paper feed subject setting unit which sets availability of paper feeding of each of the paper feed units when at least the facsimile processing is performed; and a warning unit which issues a warning when all the paper feed units are excluded from paper feeding at the time of the facsimile processing as a result of setting by the paper feeding subject setting unit.

Another aspect of the present invention is an image formation apparatus which has multiple paper feed units and selects any of the multiple paper feed units as a paper feeding subject to perform each of plural types of processing, comprising:

a paper feeding subject setting unit which sets availability of paper feeding by each of the paper feed units for each of plural types of workable processing.

A still another aspect of the present invention is a paper feed control method for an image formation apparatus which has multiple paper feed units and performs plural types of processing including at least facsimile processing, comprising: receiving a setting of availability of paper feeding of each of the paper feed units when at least the facsimile processing is performed, and issuing a warning when the received setting is excluded from target paper feeding at the time all the paper feed units perform the facsimile processing.

A still another aspect of the present invention is a paper feed control method for an image formation apparatus which has multiple paper feed units and selects any of the multiple paper feed units as a paper feeding subject to perform each of plural types of processing, comprising: receiving a setting of availability of paper feeding of each of the paper feed units for each of plural types of workable processing, and selecting a paper feeding subject from the paper feed units for each of the processing according to the received availability setting.

According to the present invention, it is configured to enable the setting of a paper feed tray for automatic paper feeding when the facsimile function is performed and also issue a warning when the automatic paper feeding cannot be performed by the above setting. Thus, automatic paper feeding of appropriate paper can be performed without disabling the automatic paper feeding due to an error or a mistake by a person who made setting.

BRIEF DESCRIPTION OF THE DRAWINGS

Preferred embodiments of the present invention will be described in detail based on the following figures, wherein:

FIG. 3 is a diagram (1) showing an example of a setting table which sets availability of automatic paper feeding for each function;

FIG. 5 is a diagram showing an example of a paper size setting table;

FIG. 6 is a diagram showing an example of a paper type setting table;

FIG. 9 is a diagram showing an example of a tray information table;

FIG. 11 is a diagram showing an example of a tray priority setting table;

FIG. 12 is a diagram (2) showing an example of a setting table which sets availability of automatic paper feeding for each function;

FIG. 13 is a diagram (3) showing an example of a setting table which sets availability of automatic paper feeding for each function;

FIG. 16 is a diagram (4) showing an example of a setting table which sets availability of automatic paper feeding for each function;

FIG. 17 is a diagram showing an example of a setting table which sets availability of automatic paper feeding for each function;

FIG. 18 is a diagram (6) showing an example of a setting table which sets availability of automatic paper feeding for each function;

FIG. 19 is a diagram (7) showing an example of a setting table which sets availability of automatic paper feeding for each function;

DETAILED DESCRIPTION OF THE PREFERRED EMBODIMENTS

Embodiments of an image formation apparatus and its paper feed control method according to the present invention will be described in detail with reference to the accompanying drawings.

Figure 1:
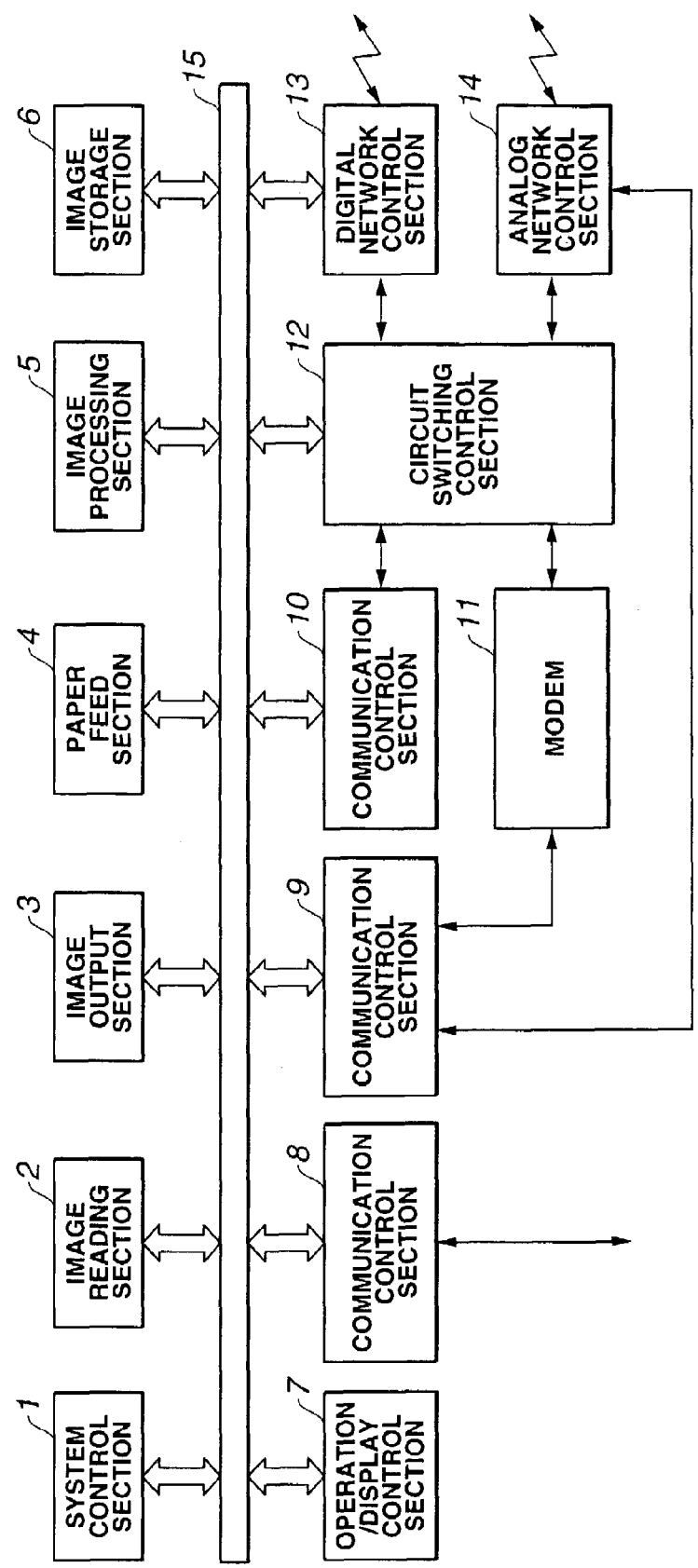
FIG. 1 is a block diagram showing an example structure of an image processing apparatus according to the present invention.

FIG. 1 is a block diagram showing an example structure of the image processing apparatus according to the present invention. As shown in FIG. 1, this image processing apparatus comprises a system control section 1, an image reading section 2, an image output section 3, a paper feed section 4, an image processing section 5, an image storage section 6, an operation/display control section 7, a communication control section 8, a communication control section 9, a communication control section 10, a modem 11, a circuit switching control section 12, a digital network control section 13, an analog network control section 14, and a system bus control section 15.

The system control section 1 controls the entire image processing apparatus and comprises, for example, a processor, a program for operating it, a memory and the like. The system control section 1 also controls paper feeding according to a function possessed by the image processing apparatus. Details will be described later.

The image processing apparatus operates in the same way as a conventional image processing apparatus excepting the paper feeding by the system control section 1 and the control of paper feeding. Therefore, the configurations other than the system control section 1 will be described briefly.

The image reading section 2 reads an original to obtain image data. The image output section 3 forms an image on a sheet according to the image data and outputs it as a print. The paper feed section 4 has multiple paper feed trays and supplies sheets from one of the paper feed trays when an image is formed by the image output section 3.

The image processing section 5 performs a variety of image processing such as coding, decoding, enlargement, reduction and the like of image data. The image storage section 6 temporarily stores and accumulates the image data.

The operation/display control section 7 performs reception of an operation instruction from a user, provision of a variety of information to the user, and the like.

The communication control section 8 controls connection to and communication with a network such as a LAN, the Internet and the like. The communication control section 9 controls communications adequate for an analog network. The communication control section 10 controls communications adequate for a digital network. The modem 11 performs modulation and demodulation of image data and the like. The circuit switching control device 12 connects to plural outside lines, by switching between, for example, a digital network and an analog network. The digital network control section 13 controls connection to the digital network. The analog network control section 14 controls connection to an analog network and has an automatic transmission/reception function.

And, the above respective sections are connected through a system bus 15 and performs transfer of a signal, data and the like.

This image processing apparatus is a multi-functional machine having multiple functions such as a copying function which outputs from the image output section 3 an image of the original read by the image reading section 2, the facsimile function which performs transmission and reception of the image data through the digital network or the analog network, the printer function which outputs a print from the image output section 3 according to the image data received from the LAN, and the like.

Figure 2:
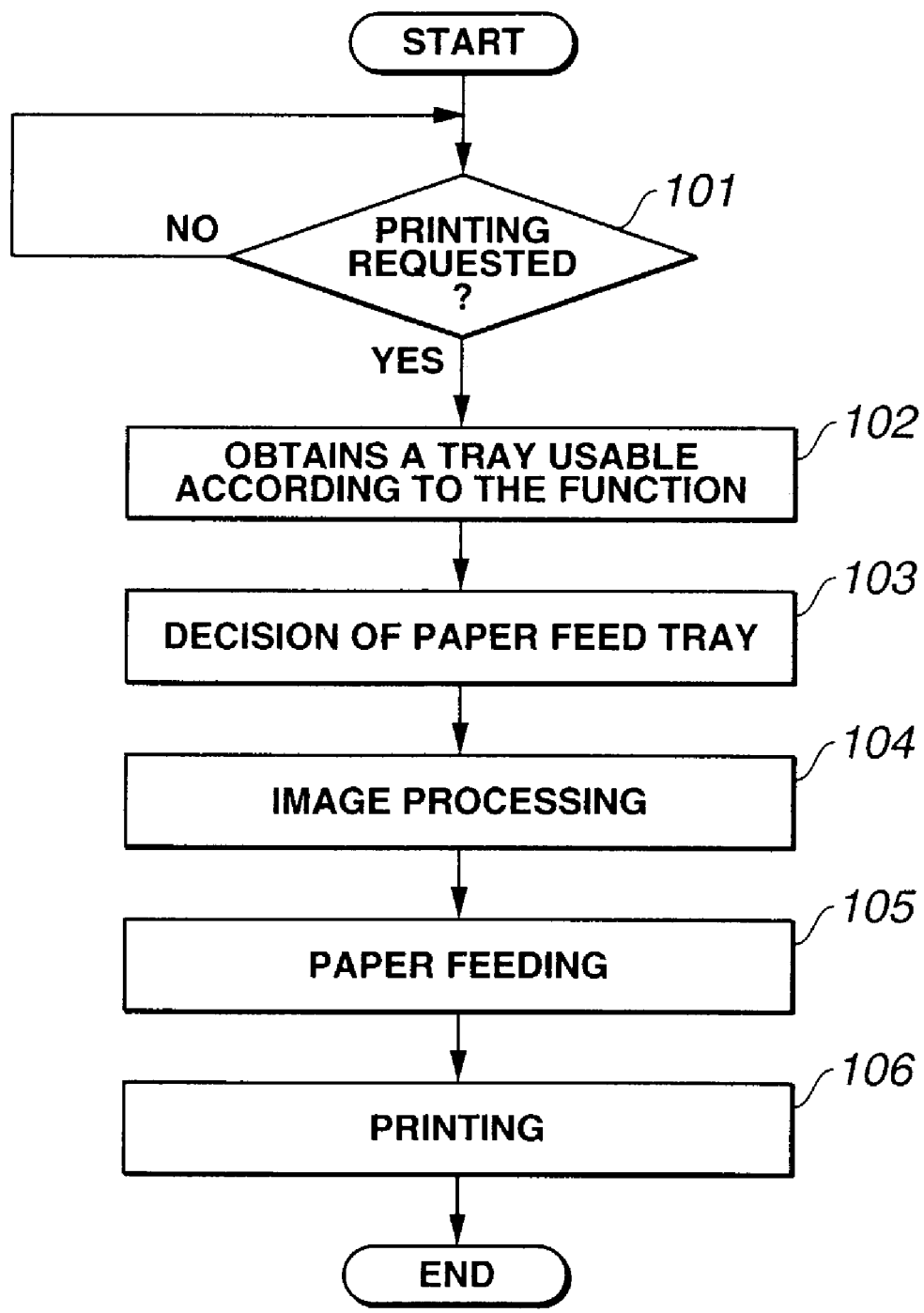
FIG. 2 is a flow chart showing a flow of a printing job by the image processing apparatus.

Here, the printing job by the image processing apparatus shown in FIG. 1 will be described. FIG. 2 is a flow chart showing a flow of the printing job by the image processing apparatus.

In the image processing apparatus, when a print request is generated (YES in step 101), the system control section 1 obtains information about an available paper feed tray determined according to the function having generated the print request (step 102). In detail, a processor configuring the system control section 1 reads the setting table as shown in FIG. 3 from a memory configuring the system control section 1 to obtain information about the available paper feed tray. The table shown in FIG. 3 shows the sizes of stored paper, paper types, tray conditions and availability of automatic paper feeding for each function with respect to the plural paper feed trays controlled by the paper feed section 4.

Subsequently, the system control section 1 decides a paper feed tray which feeds paper according to the obtained paper feed tray information and the size of image data (step 103). And, the system control section 1 makes the image processing section 5 to perform necessary image processing including the conversion of an image size of the image data stored in the image storage section 6 (step 104), instructs the paper feed section 4 to feed paper from the previously determined paper feed tray (step 105), makes the image output section 3 to print out the image which is processed on the paper fed by the paper feed section 4 (step 106) and terminates the printing job. Image data stored in the image storage section 6 is received by the facsimile function through the digital network or the analog network, received by the communication control section 8 when the printer function is used or obtained from an original by the image reading section 2 when the copy function is used.

Figure 4:
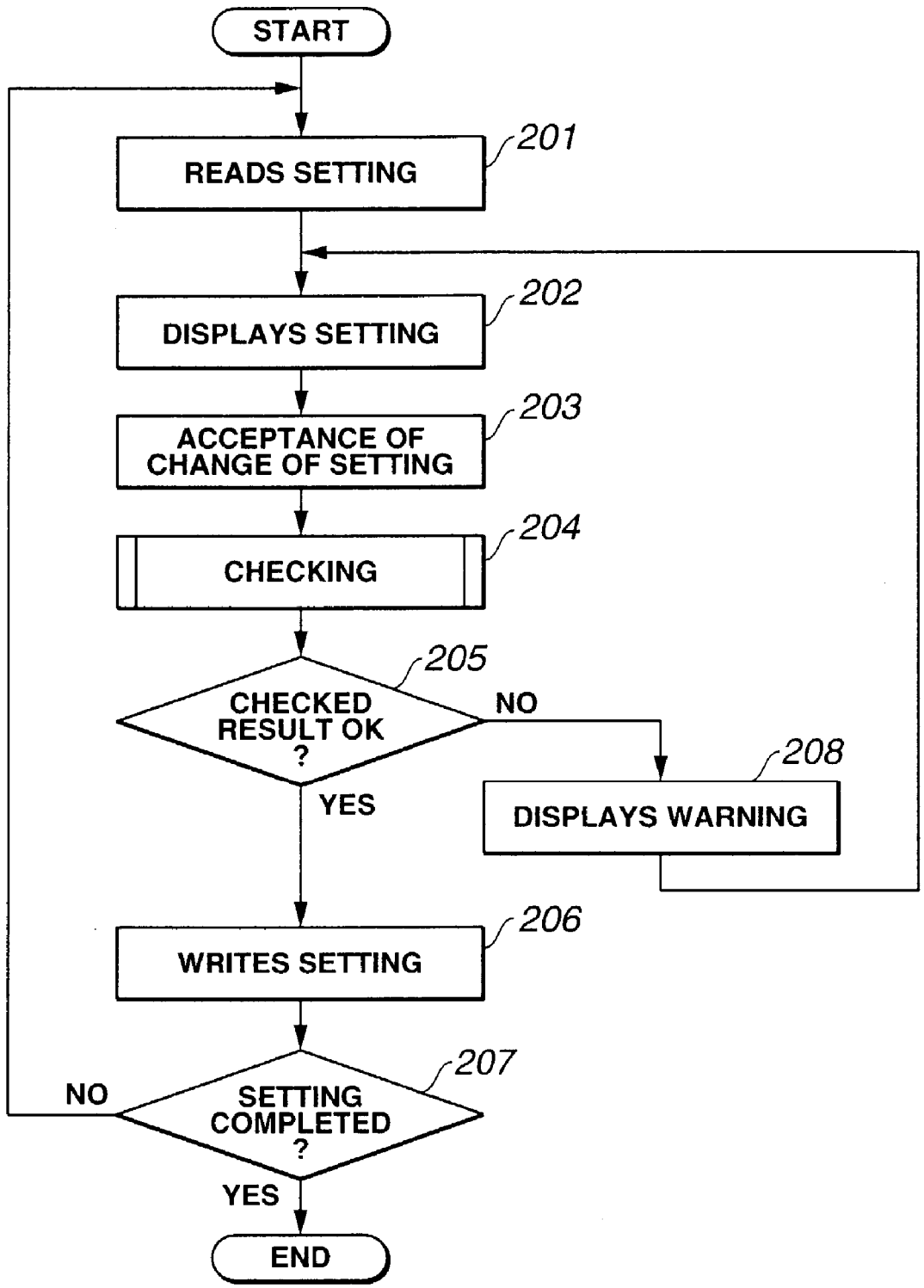
FIG. 4 is a flow chart showing a flow of generation of a table which sets availability of automatic paper feeding.

A method of preparing the table shown in FIG. 3 will be described. FIG. 4 is a flow chart showing a flow of generation of the table which sets availability of automatic paper feeding.

When the image processing apparatus starts setting of availability of automatic paper feeding, the system control section 1 obtains information about the paper size which is available and set according to the function and information about the paper type which is available and set according to the function (step 201). In detail, the processor configuring the system control section 1 obtains information by reading the paper size setting table shown in FIG. 5 and the paper type setting table shown in FIG. 6 from the memory configuring the system control section 1. The information obtained here is actually set information and, when setting is performed for the first time, the default values are obtained.

Figure 7:
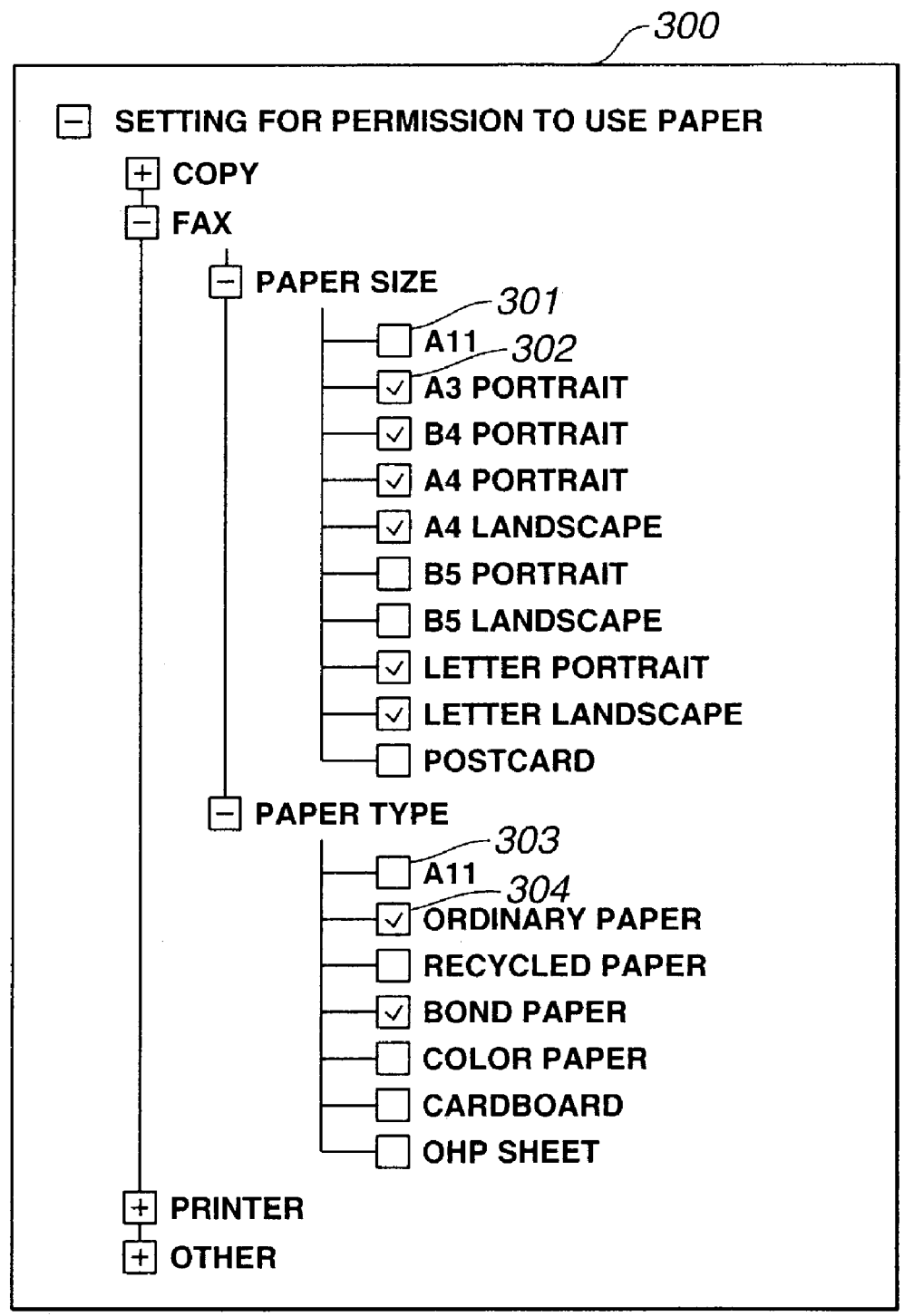
FIG. 7 is a diagram showing an example setting screen of availability of automatic paper feeding.

Subsequently, the system control section 1 shows the present setting according to the obtained paper size setting table and paper type setting table on the operation/display control section 7 (step 202). The display on the operation/display control section 7 is conducted by, for example, a screen 300 as shown in FIG. 7. The screen 300 shows a tree structure of paper size settings and paper type settings for respective functions such as copy, facsimile (Fax), printer and the like. The paper size settings and the paper type settings have respective items checked to indicate the availability of automatic paper feeding. For example, there are shown a check box 301 to set availability of automatic paper feeding of all paper sizes, a check box 302 to set availability of automatic paper feeding of an "A3 portrait" paper size, a check box 303 to set availability of automatic paper feeding of all paper types, and a check box 304 to set availability of automatic paper feeding of a paper type "ordinary paper".

After the paper size settings and paper type settings are shown, the image processing apparatus receives operation instructions to change a setting to the operation/display control section 7 by an operator (step 203). The operation for changing a setting by the operator is performed by changing the checked states in the check boxes shown on the screen 300.

When the operation/display control section 7 receives operation instructions form the operator, the system control section 1 checks the contents of the received instructions (step 204). Details of this checking job will be described later.

Subsequently, when the checked result is OK (YES in step 205), the system control section 1 writes the received setting contents to the memory of the system control section 1 (step 206), and when the termination of setting is instructed by the operator (YES in step 207), the setting of availability of automatic paper feeding is terminated.

Meanwhile, when the checked result in the step 204 is NG (NO in step 205), a warning is indicated on the operation/display control section 7 (step 208), the procedure returns to the step 202, and the operator is made to change the setting again.

After the received setting content is written into the memory, when the continuation of setting is instructed by the operator (NO in step 207), the procedure returns to the step 201, and the same processing is performed.

Figure 8:
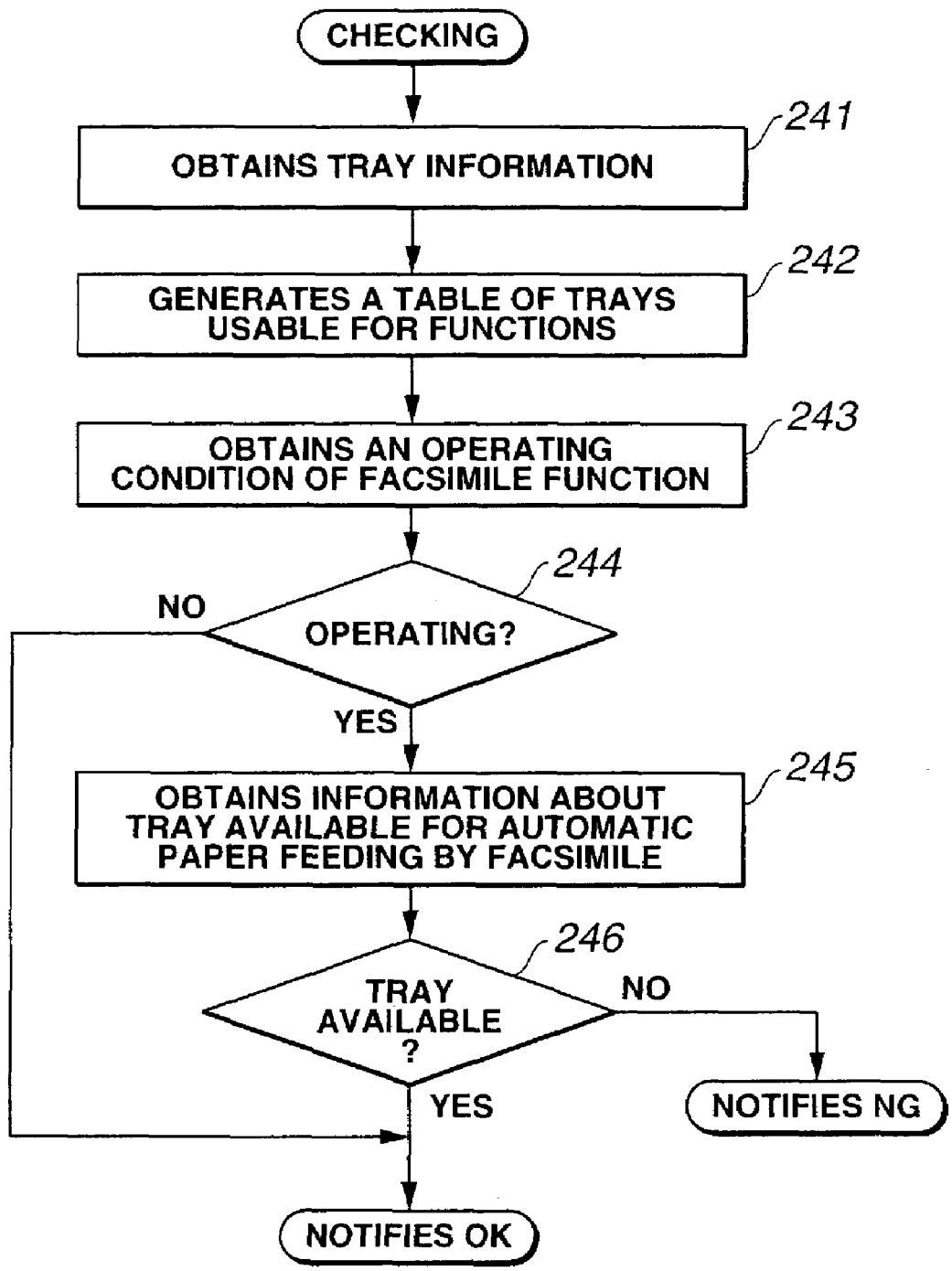
FIG. 8 is a flow chart showing a flow of check processing.

Then, the checking job performed in the step 204 will be described. FIG. 8 is a flow chart showing a flow of the checking job.

In the checking job, the system control section 1 obtains the present tray information from the paper feed section 4 (step 241). The tray information to be obtained includes, for example, the paper sizes, paper types and present states of the respective paper feed trays as shown in the tray information table of FIG. 9.

Then, the system control section 1 generates the setting table (see FIG. 3) which sets the availability of automatic paper feeding for each function according to the tray information table, the previously obtained paper size setting table (see FIG. 5) and the paper type setting table (see FIG. 6) (step 242).

Subsequently, the system control section 1 obtains an operating state of the facsimile function (step 243). When the facsimile function is operating (YES in step 244), the availability of a paper feed tray which is set to make automatic paper feeding by the facsimile is checked according to the setting table generated in the step 242 (step 245).

As a checked result, when there is a paper feed tray which can perform automatic paper feeding by the facsimile (YES in step 246), the checked result is determined to be "OK" and the checking job is terminated, but when there is not a paper feed tray which can perform automatic paper feeding by the facsimile (NO in step 246), the checked result is determined to be "NG" and the checking job is terminated.

When the facsimile function is not operating when its operation condition is obtained in the step 243 (NO in step 244), the checked result is determined to be "OK", and the checking job is terminated.

The setting table which sets availability of automatic paper feeding for each function (see FIG. 3) will be described complementarily.

In the above description, the availability of automatic paper feeding for each function was determined according to the availability of automatic paper feeding relative to the paper size, the availability of automatic paper feeding relative to the paper type, and the operation condition of the facsimile function. But, the method of deciding settings is not limited to the above description but can also be performed according to the paper size only or the paper type only. And, the operation condition of the facsimile function can be ignored, and the availability of automatic paper feed may be set for the facsimile function only.

In the above description, the setting of availability of automatic paper feeding was performed by operating the operation/display control section 7. But, it may be performed from an unshown computer which is connected via the communication control section 8. In this case, it is necessary to add a component for communication with the unshown computer to the image processing apparatus. But, when it is configured to have a web server function, separate software is not required for the unshown computer.

When the availability of automatic paper feed is set as described above, paper which is not desired to be used for printing is prevented from being used. But, when the image processing apparatus is used, there may be a request for, such as, "paper which may be used but is not desired to be used if possible" or "paper different from this paper is desired to be used first". In such a case, the request can be satisfied by previously setting the priority of paper to be used.

To set the priority of paper to be used by the image processing apparatus, the priority of paper sizes, the priority of paper types and the priority of paper feed trays are set. But, as to the paper size, the relationship with the image size generally takes precedence. Therefore, setting of the priority of the paper feed trays and setting of the priority of the paper types will be described below.

Figure 10:
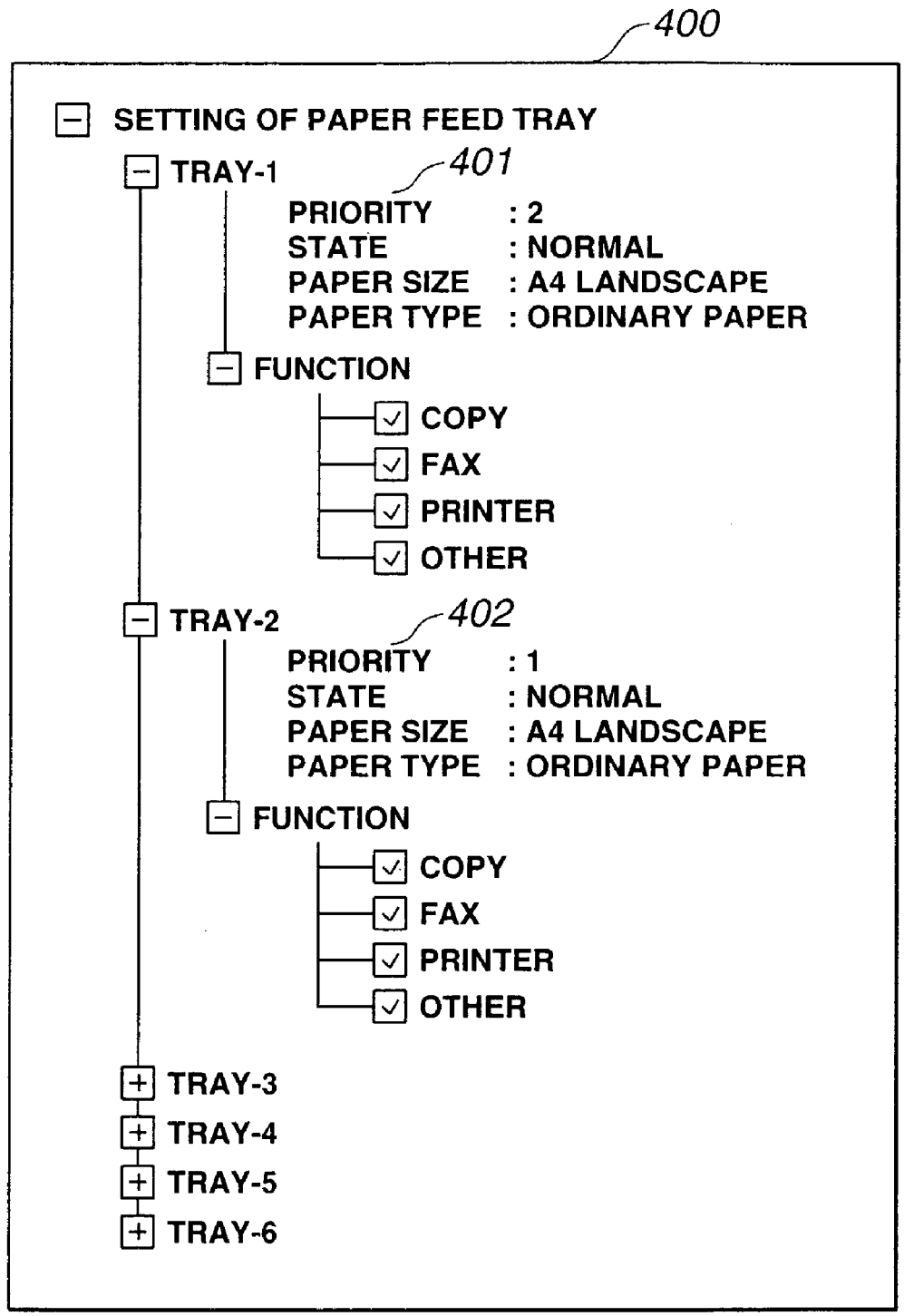
FIG. 10 is a diagram showing an example setting screen of the priority of paper feed trays.

First, to set the priority of the paper feed trays, a screen 400 shown in FIG. 10 is shown on the operation/display control section 7. The screen 400 can be used to set priority 401 and priority 402 of respective trays. When the priority is set on the screen 400, a tray priority setting table as shown in FIG. 11 is stored in the system control section 1. And, a setting table which sets availability of automatic paper feeding for each function is generated as shown in FIG. 12. Thus, even if paper having the same size and type are stored in a tray 1 and a tray 2, paper feeding from the tray 2 takes precedence according to the set priority. Instead of the setting table shown in FIG. 12, a setting table can be generated with attention directed to only a tray which is set to allow paper feeding by the facsimile function as shown in FIG. 13

Figures 14, 15:
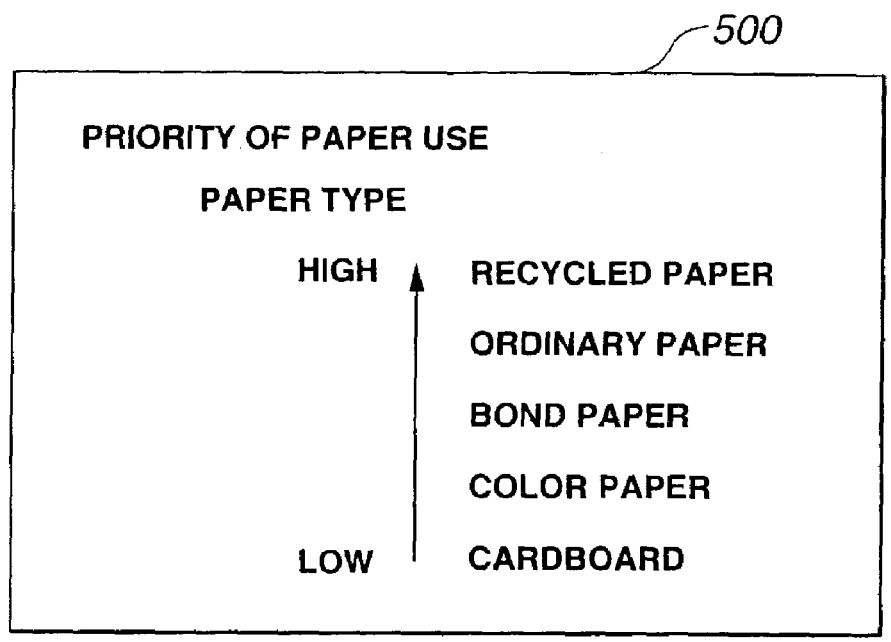
FIG. 14 is a diagram showing an example setting screen of the priority of paper types.
FIG. 15 is a diagram showing an example of a paper type priority setting table.

To set the priority of paper types, a screen 500 as shown in FIG. 14 is shown on the operation/display control section 7. The screen 500 can set the priority according to the paper types. When the priority is set on the screen 500, a paper type priority setting table as shown in FIG. 15 is stored in the system control section 1. And, a setting table which sets availability of automatic paper feed of each function is generated as shown in FIG. 16. Instead of the setting table shown in FIG. 16, a setting table can be generated with attention directed to only trays which are set to allow paper feeding by the facsimile function as shown in FIG. 17.

Besides, when both the priority of the paper feed trays and the priority of the paper types are set, a setting table which sets availability of automatic paper feeding for each function is generated as shown in FIG. 18. Instead of the setting table shown in FIG. 18, a setting table as shown in FIG. 19 can be generated with attention directed to only trays which are set to allow paper feeding by the facsimile function. In this case, it is necessary to calculate the order of used paper feed trays. The calculation can be made, for example, as follows.

Priority=priority of paper types+priority of paper feed trays

And, it may also be calculated as follows by adding a weight to the priority of paper types.

Figure 20:
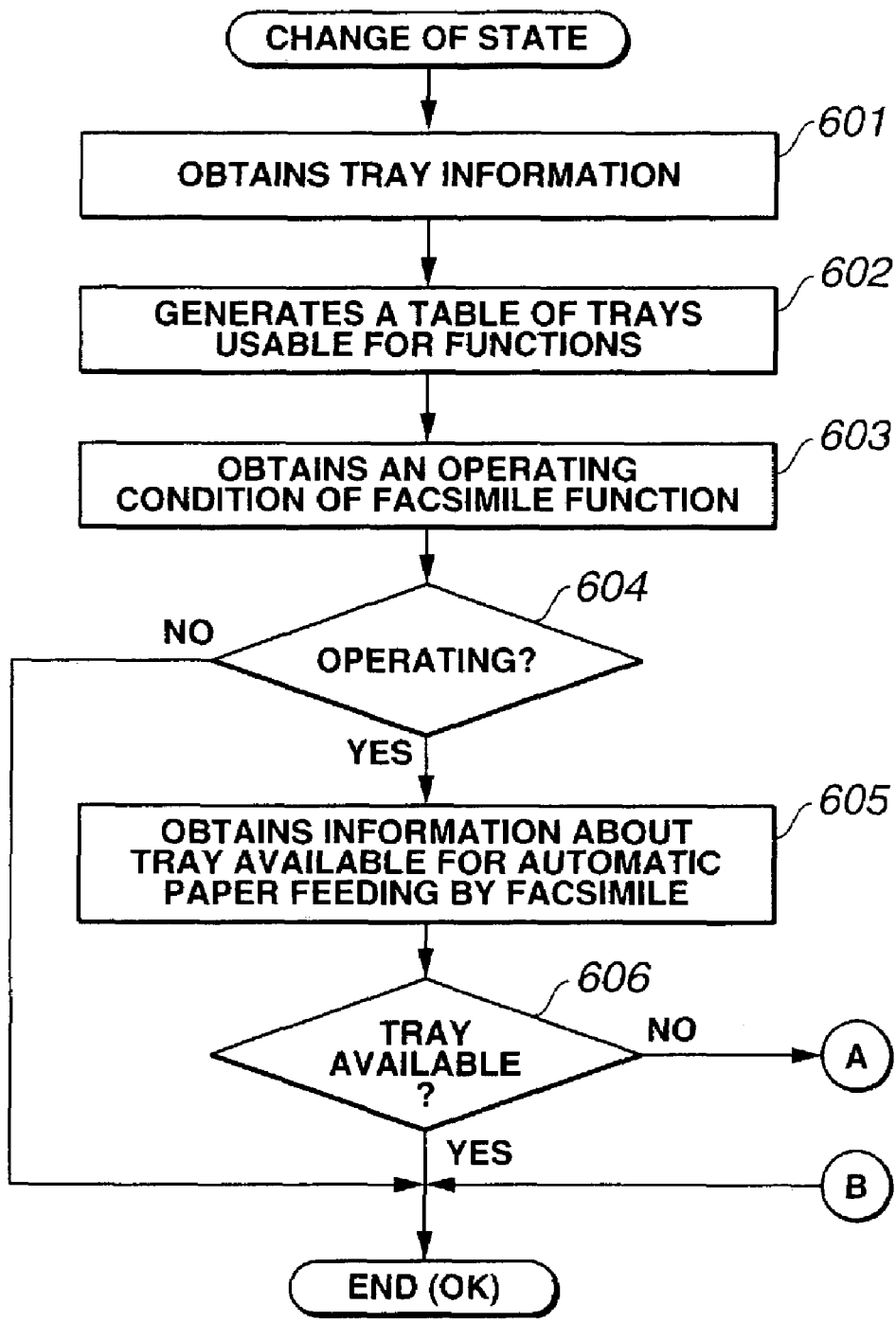
FIG. 20 is a flow chart (1) showing a flow of a forced setting changing job.
Figure 21:
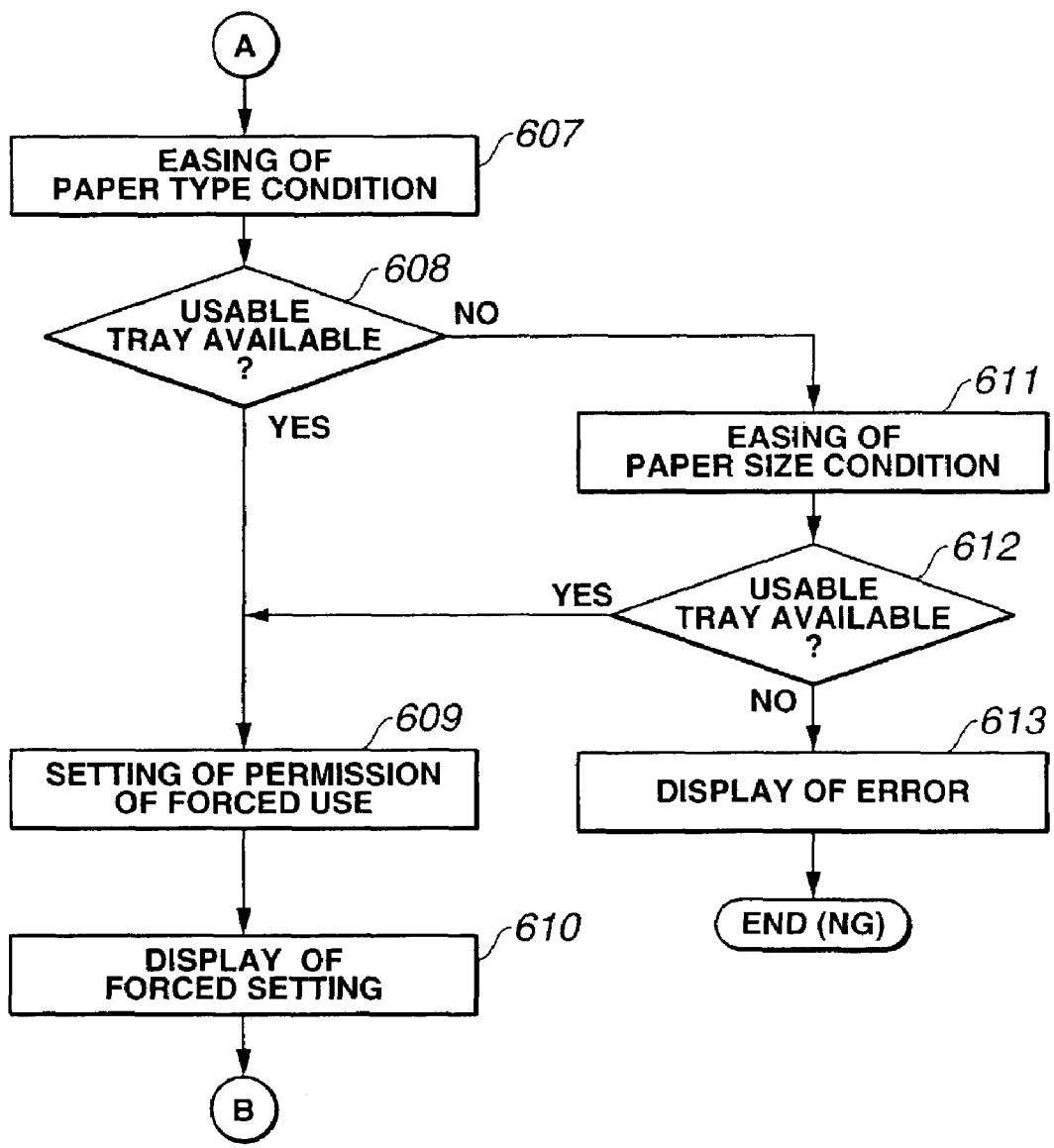
FIG. 21 is a flow chart (2) showing a flow of a forced setting changing job.

Priority=weight coefficient×priority of paper types+ priority of paper feed trays In the above description, the setting of availability of automatic paper feeding was described, but the image processing apparatus has a tendency to change its state dynamically because the paper feed tray may be out of paper while operating, the paper feed tray may have a trouble, or the like. When the state changes as described above, the setting of availability of automatic paper feeding may become inappropriate, but such an inappropriate setting is desirably avoided as much as possible. Therefore, a forced setting change to be performed in case of a change in state of the image processing apparatus will be described. FIG. 20 and FIG. 21 are flow charts each showing a flow of forced setting change processing.

If there is a change in state of the paper feed tray, the system control section 1 obtains the present tray information from the paper feed section 4 (step 601) and generates a setting table which sets availability of automatic paper feeding for each function (see FIG. 3) according to the tray information, the previously obtained paper size setting table (see FIG. 5) and paper type setting table (see FIG. 6) (step 602).

Then, the system control section 1 obtains an operating state of the facsimile function (step 603). When the facsimile function is operating (YES in step 604), the presence or not of a paper feed tray which is set to allow automatic paper feeding by the facsimile is checked according to the setting table generated in step 602 (step 605).

When the checked result shows the presence of a paper feed tray which allows automatic paper feeding by the facsimile (YES in step 606), it is determined that there is no inappropriate effect by a change in tray state, the checked result is determined to be "OK", and the check processing is terminated. And, if the facsimile function is not operating when the operating state of the facsimile function is obtained in step 603 (NO in step 604), the checked result is determined to be "OK", and the check processing is terminated.

Meanwhile, if there is no paper feed tray which can make automatic paper feeding by the facsimile (NO in step 606), the system control section 1 eases the conditions of paper types (step 607). As a result, when a paper feed tray becomes available to perform automatic paper feeding by the facsimile (YES in step 608), a setting to allow forced use, e.g., a change of flag, is performed (step 609). And, it is displayed on the operation/display control section 7 that the forced setting was conducted (step 610), the checked result is determined to be "OK", and the check processing is terminated.

Even if the condition of the paper types is eased, when there is no paper feed tray which can perform automatic paper feeding by the facsimile (NO in step 608), the system control section 1 eases the conditions of the paper sizes (step 611). As a result, when a paper fed tray which can make automatic paper feed by the facsimile becomes available (YES in step 612), a setting to allow forced use, e.g., a change of a flag, is performed (step 609). And, it is shown on the operation/display control section 7 that the forced setting was performed (step 610), the checked result is determined to be "OK", and the check processing is terminated.

And, even if the condition of the paper sizes is eased, when there is no paper feed tray which can perform automatic paper feeding by the facsimile (NO in step 612), it is judged that printing by the facsimile function is impossible, it is shown as an error on the operation/display control section 7 (step 613), the checked result is determined to be "NG", and the check processing is terminated.

The conditions to be eased in the step 607 or step 611 are not necessarily required to be in the order of paper types and paper sizes.

What is claimed is:

1. An image formation apparatus which has multiple paper feed units and performs plural types of processing including at least facsimile processing, comprising:
   a display control unit that controls, in response to an operator starting an availability setting process, a display to display availabilities for paper feeding for each of the paper feed units, the availabilities indicating for corresponding paper feed units whether or not paper feeding can be performed for facsimile processing;
   a paper feed subject setting unit which changes a setting according to an operation being made by the operator operating the display; and
   a warning unit which issues a warning before termination of the availability setting process when the operation instructs that all the paper feed units are set to be excluded from the subject of the paper feeding in the facsimile processing.

2. The image formation apparatus according to claim 1, wherein the paper feed subject setting unit sets availability of paper feeding of each of the paper feed units according to a designated paper size.

3. The image formation apparatus according to claim 1, wherein the paper feed subject setting unit sets availability of paper feeding of each of the paper feed units according to a designated paper type.

4. The image formation apparatus according to claim 1, wherein the paper feed subject setting unit sets availability of paper feeding by the paper feed units for each of plural types of workable processing.

5. The image formation apparatus according to claim 1, wherein the paper feed subject setting unit sets a priority for use of sheets of paper which are fed by the respective paper feed units.

6. The image formation apparatus according to claim 5, wherein the priority is set for each of the paper feed units.

7. The image formation apparatus according to claim 5, wherein the priority is set for each type of paper fed by the paper feed units.

8. The image formation apparatus according to claim 1, further comprising a forced changing unit which forces a change of a setting made by the paper feed subject setting unit when states of the paper feed units are changed.

9. A paper feed control method for an image formation apparatus which has multiple paper feed units and performs plural types of processing including at least facsimile processing, comprising:
controlling, in response to an operator starting an availability setting process, a display to display availabilities for paper feeding for each of the paper feed units, the availabilities indicating for corresponding paper feed units whether or not paper feeding can be performed for facsimile processing;
receiving an instruction that changes a setting according to an operation being made by the operating the display, and
issuing a warning before termination of the availability setting process when the operation instructs that all the paper feed units are set to be excluded from the subject of the paper feeding in the facsimile processing.

10. The paper feed control method for an image formation apparatus according to claim 9, wherein availability of paper feeding of each of the paper feed units is set according to a designated paper size.

11. The paper feed control method for an image formation apparatus according to claim 9, wherein availability of paper feeding of each of the paper feed units is set according to a designated paper type.

12. The paper feed control method for an image formation apparatus according to claim 9, wherein availability of paper feeding by the paper feed units is set for each of plural types of workable processing.

13. The paper feed control method for an image formation apparatus according to claim 9, wherein a priority for use of sheets of paper which are fed by the respective paper feed units is further set.

14. The paper feed control method for an image formation apparatus according to claim 13, wherein the priority is set for each of the paper feed units.

15. The paper feed control method for an image formation apparatus according to claim 13, wherein the priority is set for each type of paper fed by the paper feed units.

16. The paper feed control method for an image formation apparatus according to claim 9, wherein the setting is forcedly changed when the states of the paper feed units are changed.

* * * * *